US005481806A

United States Patent [19]

Pratt

[11] Patent Number: 5,481,806

[45] Date of Patent: Jan. 9, 1996

[54] TONGUE ATTACHMENT FOR CIRCULAR SAW

[76] Inventor: Edgar L. Pratt, P.O. Box 749, Montesano, Wash. 98563

[21] Appl. No.: 266,732

[22] Filed: Jun. 27, 1994

[51] Int. Cl.[6] .......................... B23D 45/16; B23D 47/00

[52] U.S. Cl. .......................... 30/391; 30/390

[58] Field of Search .......................... 30/390, 391, 376

[56] References Cited

U.S. PATENT DOCUMENTS

| | | | |
|---|---|---|---|
| 2,737,985 | 3/1956 | Utz | 143/159 |
| 2,963,056 | 12/1960 | Rickford | 143/159 |
| 3,706,332 | 12/1972 | George | 143/159 |
| 4,856,394 | 8/1989 | Clowers | 30/391 |
| 5,235,753 | 8/1993 | Stumpt | 30/391 |
| 5,361,501 | 11/1994 | Fajnziajn | 30/391 |

FOREIGN PATENT DOCUMENTS

| | | | |
|---|---|---|---|
| 964963 | 3/1975 | Canada | 30/391 |
| 1113837 | 12/1981 | Canada | 30/391 |
| 881727 | 7/1949 | Germany | 38/10 |

*Primary Examiner*—Dougals D. Watts
*Attorney, Agent, or Firm*—Brian J. Coyne

[57] ABSTRACT

A Tongue attachment for a portable electric circular saw equipped with a lower retractable or pivoting blade guard in which in a closed position the guard covers most of the blade, to a retracted position in which the cutting edge is exposed to material for cutting. An interior wall of the lower guard of such conventional saws has a quarter-circular leading edge that serves as a point of sliding contact with the work piece as the saw cuts through the piece. An opposite, exterior wall of such conventional guards lacks a similar leading edge. Consequently, the lower guard of such saws of conventional design have a tendency to catch the concave wall of the face of the guard on the material being worked. This stops the saw from proceeding until the handle on the guard is used to lift it from this catching position. The Tongue attachment completely eliminates this problem. In an alternative embodiment, such a tongue is made an integral part of a lower guard.

5 Claims, 4 Drawing Sheets

TONGUE ATTACHMENT FOR CIRCULAR SAW

BACKGROUND OF THE INVENTION

1. Field of the Invention

The present invention relates to portable electric circular saws equipped with an upper stationary guard and a lower pivoting guard, and more specifically to a tongue attachment for a pivoting lower guard of a portable electric circular saw.

2. Description of the Prior Art

Conventional portable electric power saws include a housing having a motor supported thereon. A shaft driven by the motor has a circular saw blade fixed thereto. A shoe plate is attached to the housing and is adapted to support the saw for movement along a workpiece. A stationary upper guard is fixed to the housing, which provides a protective cover for the upper half of the saw blade. A lower guard is pivotally supported upon the housing and is movable into the upper guard from a first, closed position in which it encompasses substantially the lower half of the saw blade, to a second, retracted position in which a portion of the saw blade edge is exposed and ready to cut into a workpiece. A tension spring or coil spring biases the lower guard toward the closed position. A manipulating handle attached to the housing is situated upwardly from the upper guard at a side thereof and includes a trigger switch to switch the motor on and off. See, for example, Utz U.S. Pat. No. 2,737,985.

Conventionally, the upper guard on portable electric circular saws comprises an interior wall integral with or attached to the housing; an annular, exterior wall parallel to the interior wall; and a peripheral wall in the form of a semicircular band that joins the exterior and interior walls. The lower guard includes an interior wall having an integral, centrally-disposed, apertured hub for pivotally mounting the lower guard on a collar disposed about the motor shaft and attached to the housing; an annular, exterior wall parallel to the interior wall; and a semicircular band-shaped peripheral wall that joins the exterior and interior walls. The peripheral wall of the upper guard is wider than the peripheral wall of the lower guard, which permits the lower guard to telescope into the upper guard. A forwardmost portion of the lower guard conventionally is adapted to present a bearing surface to a nearest edge of a workpiece that will cause the lower guard to progressively move from a closed position to a retracted position as the saw is initially fed forward into the workpiece—that is, the leading edges of the interior and exterior walls of the lower guard move into sliding engagement with a nearest edge of the workpiece. Conventionally, the leading edge of the interior wall of the lower guard follows a quarter-circular arc, more or less, directed radially inward toward the rotational axis of the saw, which arc typically is chosen to be about half of the radius of curvature of the peripheral wall of the lower guard—that is, about half of the radius of the largest circular blade that the saw will accommodate. Thus, even as the lower guard moves from a closed position to a retracted position as the saw is fed into a workpiece, the direction of feed of the saw remains normal to the portion of the leading edge of the interior wall of the lower guard that engages the workpiece. The leading edge of the exterior wall, however, although usually also curved radially inward, is conventionally of diminished radius of curvature as compared to the leading edge of the interior wall of the lower guard. When attempting to saw through relatively thin wood, such as plywood, however, the leading edge of the exterior wall in such conventional saws tends to bind or snag on the nearest edge of the cut, bifurcated workpiece, thereby impeding forward feed of the saw into the workpiece, particularly when the bifurcated portions of the workpiece become misaligned. The present invention is intended to prevent such binding and snagging of the lower guard.

SUMMARY OF THE INVENTION

My tongue attachment overcomes the above-described disadvantage of conventional lower guards for portable electric circular saws by providing a leading edge for the exterior wall of the lower guard to substantially match the leading edge of the interior wall thereof in conventional saws of that type. The present invention comprises a tongue for attachment to a forwardmost portion of an exterior wall of a lower guard of a portable electric circular saw, having an arcuate leading edge that describes a quarter-circular arc, more or less, directed rearward and radially inward from the peripheral wall of the lower guard toward the rotational axis of the saw blade. A preferred radius of curvature of the leading edge of the tongue is about half the radius of the peripheral wall of the lower guard. Attachment and use of the tongue with conventional saws of this type requires no alteration to the saw other than to drill apertures in the exterior wall of the lower guard for mounting the tongue. In an alternative embodiment, the tongue as herein described is incorporated into, and made an integral part of, a lower guard for a portable electric circular saw.

OBJECTS OF THE INVENTION

An object of the present invention is to provide a tongue attachment for a lower guard of a portable electric circular saw that eliminates the binding and snagging that commonly occurs when cutting a relatively thin workpiece.

Another object is to provide a leading edge for an exterior wall of a lower guard of a conventional portable electric circular saw that matches in size and curvature the leading edge of the interior wall of the lower guard.

Still another object is to provide a tongue for use with a saw of the kind described that requires no alterations to the saw other than drilling apertures in an exterior wall of the lower guard thereof for mounting the tongue.

Yet another object is to provide a tongue for attachment to a lower guard of a portable electric circular saw that is simple and inexpensive to make and durable in use.

Still a further object is to provide an improved lower guard for a portable electric circular saw wherein a tongue of the kind described is made an integral part of the forwardmost portion of the exterior wall thereof.

BRIEF DESCRIPTION OF THE DRAWINGS

With reference to FIG. 1, the terms “front” an “forward” shall refer to the left side, and the term “rear” shall refer to the “right” side.

DETAILED DESCRIPTION OF THE PREFERRED EMBODIMENT

Figure 1:
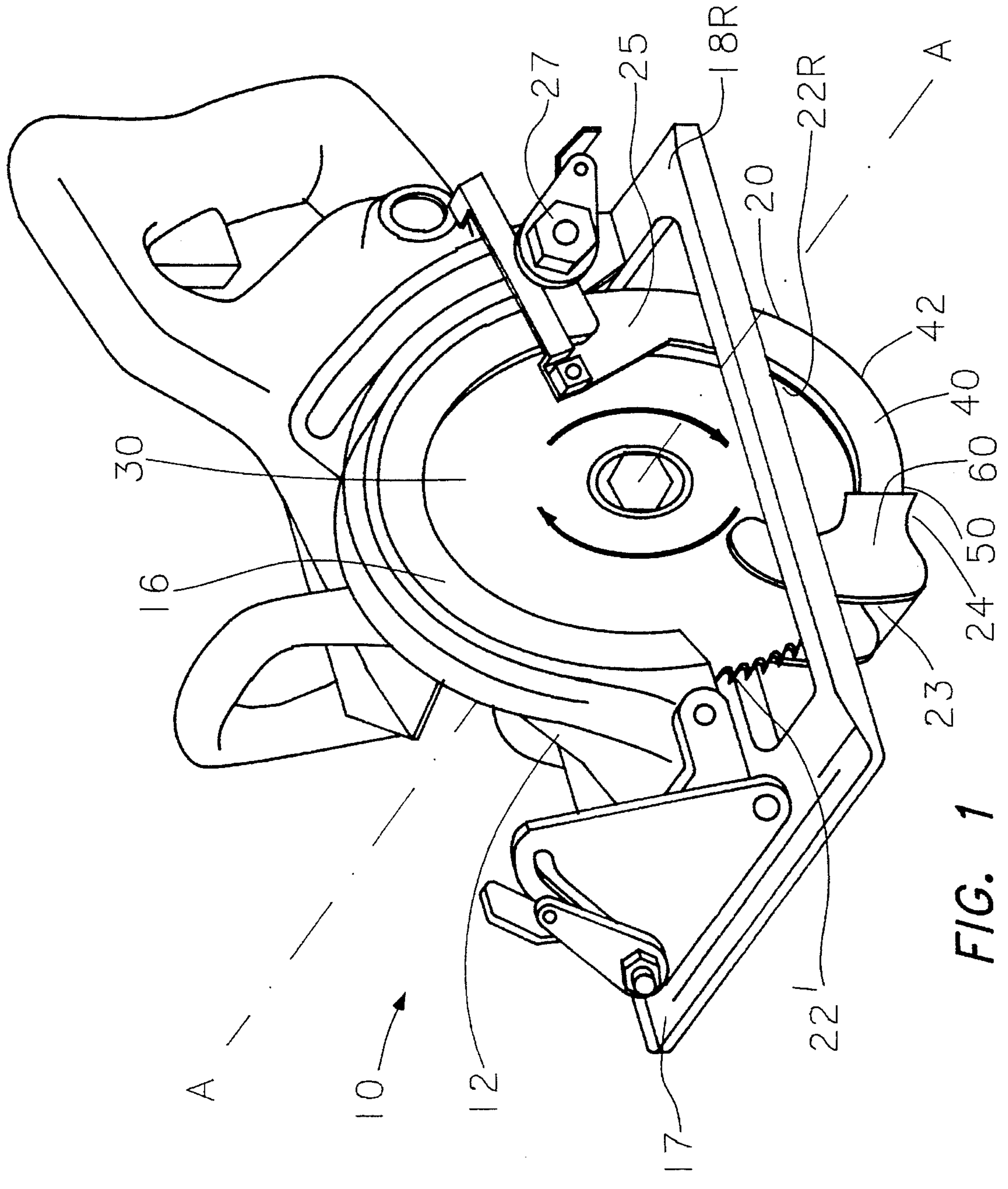
FIG. 1 is a frontal persepective view of a portable elctric circular saw with a circular saw blade installed and having a tongue according to the present invention attached to an external wall of the lower guard of the saw.
Figure 2:
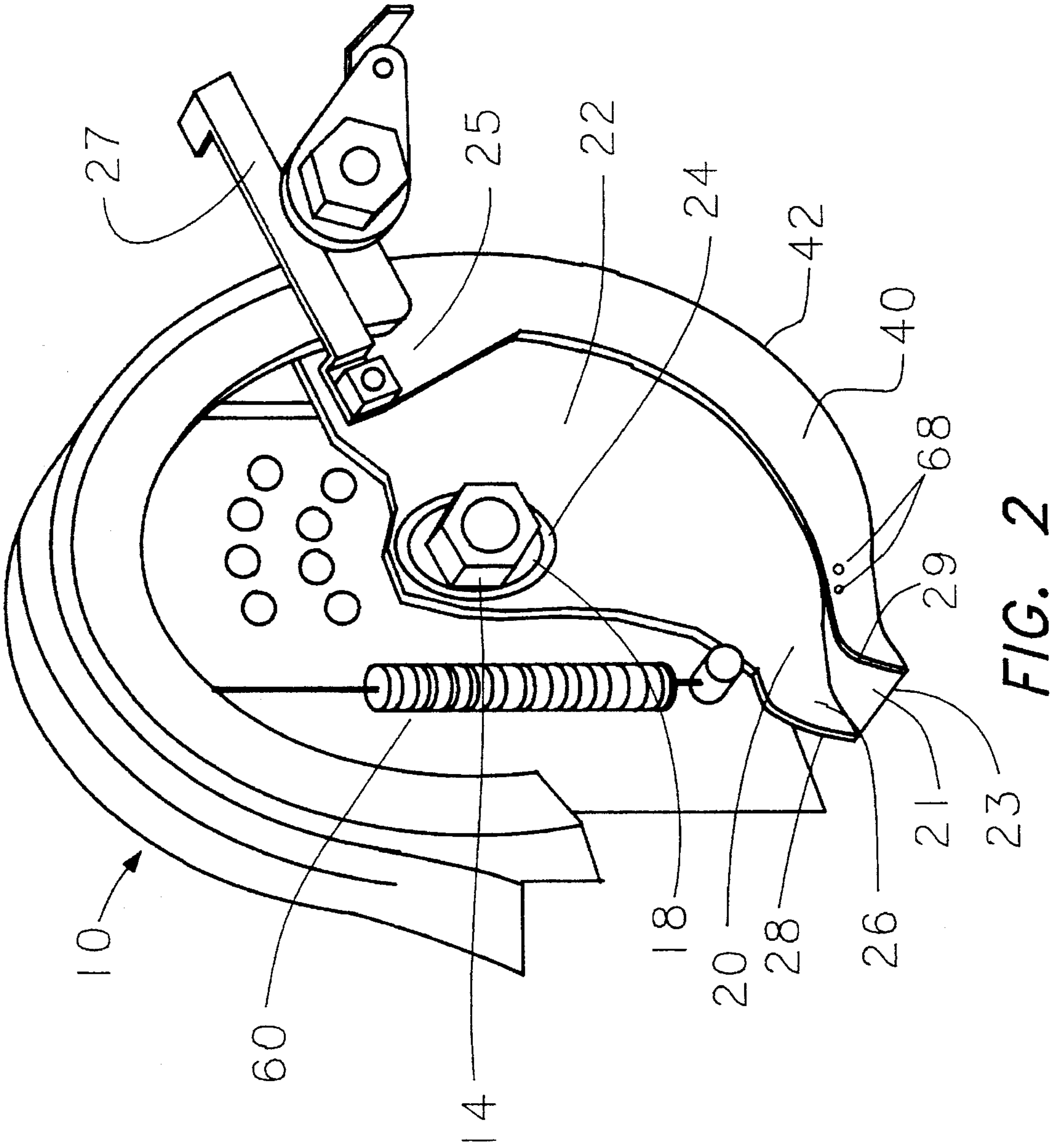
FIG. 2 is a frontal perspective of such a saw with the saw blade, shoe, housing and tongue removed for visual clarity, and showing the arcuate leading edges of the interior and exterior walls of the lower guard.

A portable electric circular saw 10 of conventional design is illustrated in FIGS. 1 and 2, comprising a housing 12, an electric motor (not shown) enclosed by the housing with attached motor drive shaft 14 for driving rotation of a circular saw blade 30 mountable thereon about axis A, an upper guard 16 fixed to the housing, and a shoe 17 for supporting the saw for movement along a workpiece. A collar 18 is fixed to the housing 12 and circumposed about the drive shaft 14. A lower guard 20 is mounted on the collar 18 for pivoting movement about axis A. The lower guard 20 includes a flat interior wall 22 having an apertured hub 24, which encircles the collar 18; a flat, annular-shaped exterior wall 40; and a semicircular band-shaped pheripheral wall 50 that joins the interior wall 22 and the exterior wall 40. At a forwardmost end 21, the lower guard 20 protrudes forward and radially outward to provide a bearing surface to engage a workpiece when the saw 10 is fed forward into the workpiece. A lever 27 is attached to a rear portion 25 of the lower guard 20 from which it extends rearward. Counter-clockwise rotation of the lever 27 pivots the lower guard 20 from a closed position, in which the guard 20 covers and protects substantially all of the lower half of the saw blade 22, to a retracted position in which a portion of the cutting edge 22' is exposed. A tension spring 60 has one end attached to the hub 24 and an opposite end attached to the housing 12, thereby biasing the lower guard 20 toward the closed position. A forwardmost portion 26 of the inner wall 22 has an arcuate leading edge 28 that extends radially inward and rearward from a leading edge 23 of the peripheral wall 24. The leading edge 28 is conventionally an arc extending through one quarter of a circle and having a radius equal to one half of the radius of the peripheral wall 24 of the lower guard 20, more or less. As may be seen in FIG. 2, conventionally, the exterior wall 40 of the lower guard 20 is also provided with an arcuate leading edge 29, which also extends radially inward and rearward, but has a significantly smaller radius of curvature than the leading edge 28 of the interior wall 22.

Figure 3:
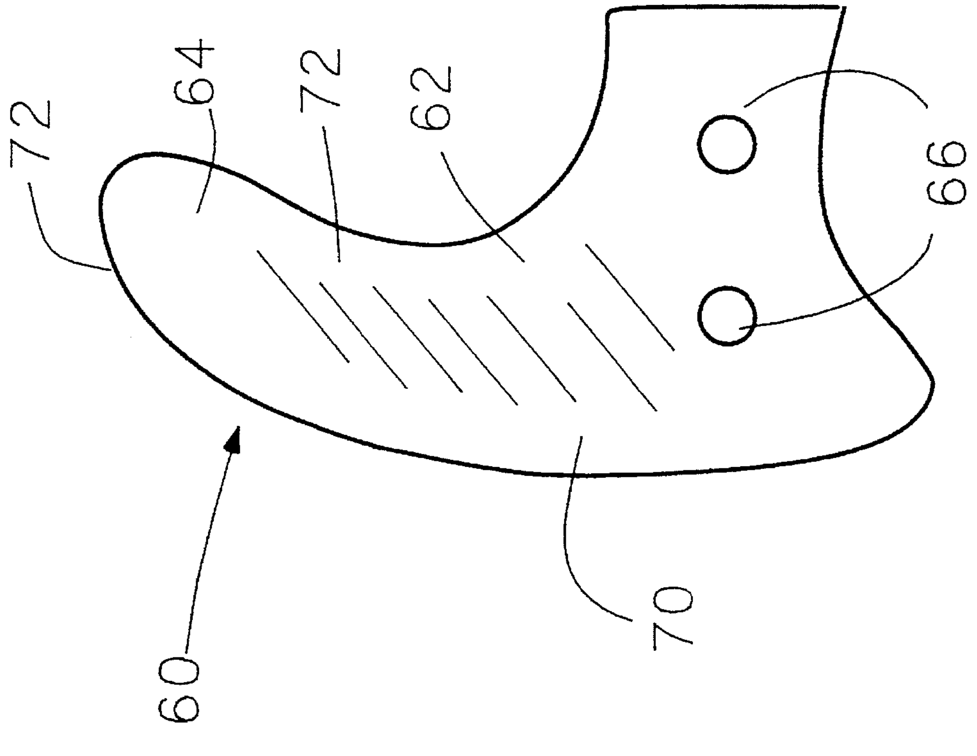
FIG. 3 is a plan view of the tongue attachment of the present invention.

Referring to FIGS. 1 and 3, the tongue attachment 60 of the present invention is a flat plate having a base end 62 for attachment to an exterior wall 40 of the forwardmost end 21 of the lower guard 20, and a free end 64 that extends from the base end 62 radially inward and rearward toward the blade rotational axis A. A pair of mounting apertures 66 are provided in the base end 62 through which threaded bolts or rivets may be inserted into matching aperatures 68 drilled in the external wall 40 of the lower guard 40 to secure the tongue 60 thereto. The tongue 60 is provided with an arcuate leading edge 70 that matches the conventional leading edge 28 of the interior wall 22 of the lower guard 20; that is, the leading edge 70 is also an arc extending through one quarter of a circle and having a radius equal to one half of the radius of the peripheral wall 24 of the lower guard 20, more or less.

The tongue 60 is preferably made from a rigid, durable plastic or from metal, such as steel, and is preferably at least as thick as the leading edge 28, but may be even thicker. The leading edge 70 of the tongue 60 should be smooth in order to minimize friction when in sliding engagement with a workpiece. The tip 72 of the tongue 60 at the free end 64 thereof is rounded as it is desirable to avoid creating a hazardous, sharp projection. The tongue 60 is also preferably provided with an arcuate trailing edge 72, centrally curved forwardly between the base end 62 to the free end 64, in order to minimize the tongue's intefering with observation of the cutting edge 22' of the blade 22 when the saw 10 is cutting through a work piece.

In use, after adjusting the housing 12 with respect to the shoe 17 for the desired depth of cut and bevel angle, and with the blade 22 in powered rotation, the saw 10 is advanced forward toward a work piece. Both of the leading edges 28, 70 initially engage a nearest edge of the workpiece, thereby causing the lower guard 20 to pivot counter clockwise around the collar 18 to a position adjacent the rear exterior corner 18R of the shoe 18 as the cutting edge 22' of the blade 22 cut into the work piece. Thereafter, as the saw 10 cuts through the workpeice, the work piece bifurcates along the sawn edges, and the portions of the the sawn edges of the work piece nearest a rear portion 22R of the blade 22, and on opposite sides thereof, remain in sliding engagement with the leading edges 28 and 70. In this manner, even if the sawn portions of the work piece are misaligned or not coplanar, as is common when cutting plywood, the saw advances smoothly through a work piece, without snags or binding of the lower guard 20 on the work piece.

Figure 4:
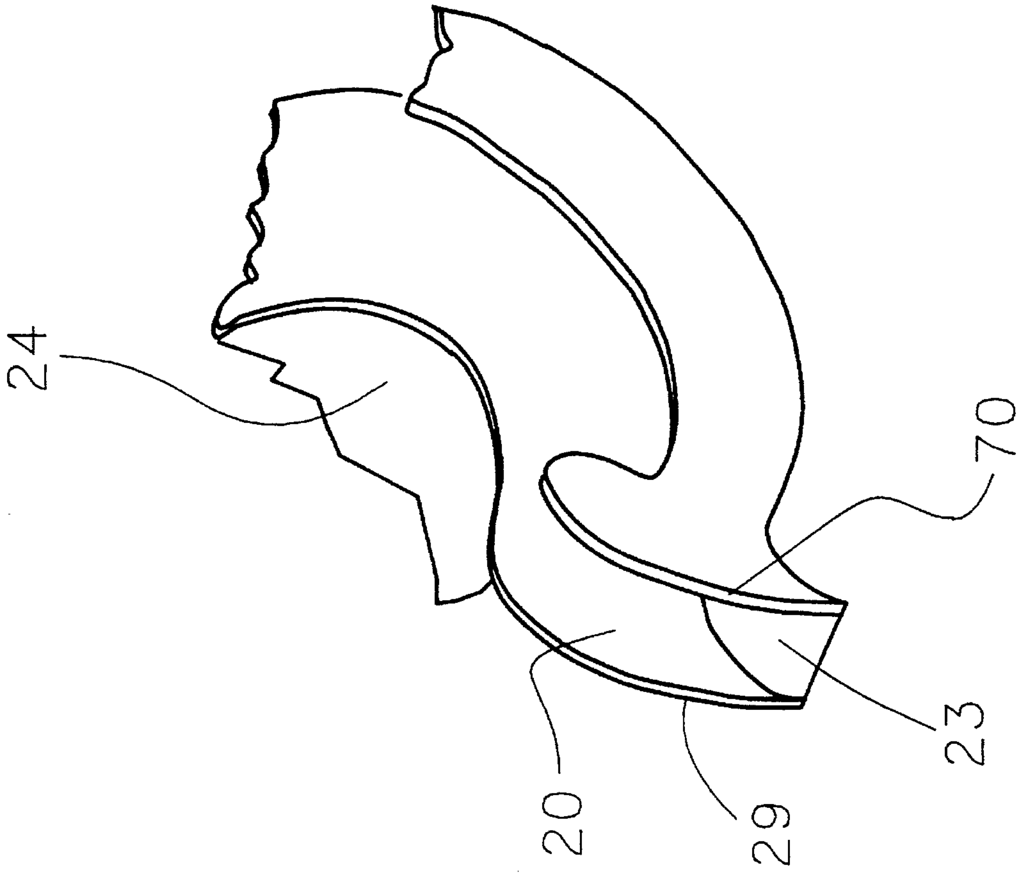
FIG. 4, illustrating an alternative embodiment of the invention, is a fragmentary, frontal perspective view of a lower guard and upper guard, in which a tongue is made an integral part of a forwardmost portion of an exterior wall of the lower guard.

In an alternate embodiment of the invention, instead of attaching a tongue 60 to a lower guard 20 of the above-described conventional design, such a tongue can be made an integral part of the lower guard 20. That is, as illustrated in FIG. 4, a lower guard 20 for a portable electric circular saw 10 can be manufactured in all ways similar to that depicted in FIG. 2, except that the lower guard 20 includes a tongue of the kind described, integral with the forwardmost portion of the exterior wall 40 of the lower guard 20.

I claim:

1. A tongue attachment for a portable electric circular saw equipped with a stationary upper guard fixed to the housing thereof and a lower guard pivotally supported on the housing and positionable to encompass the cutting edge of a circular saw blade along substantially the lower half of said blade, said lower guard having an interior wall with an arcuate leading edge for sliding engagement with a work piece, comprising:

a flat plate having a base end for attachment to an exterior surface of a forwardmost portion of the lower guard and a free end that extends from the base end radially inward toward the rotational axis of the blade, and having an arcuate leading edge substantially similar to the leading edge of the exterior wall and curved rearwardly from the base end toward the free end; and means for attaching the base end of the tongue attachment to the lower guard;

wherein the leading edge of the tongue attachment includes substantially a quarter sector of a circle having a diameter half that of the largest diameter circular saw blade that the saw will accommodate, more or less, and whereby, in use, with the blade in powered circular motion, initial forward movement of the portable electric saw into a work piece causes a sliding engagement of the work piece along the leading edges of the interior wall and of the tongue attachment, thereby inducing a corresponding, smooth progressive movement of the lower guard from a first, closed position, to a second, retracted position, and further forward movement of the saw through the work piece likewise maintains the lower guard in a retracted position so that the leading edge of the tongue attachment smoothly slides over a bifurcated portion of the work piece and snags are thereby avoided.

2. The tongue attachment of claim 1 wherein a first pair of apertures are drilled in the base end of the attachment and a corresponding second pair of apertures are drilled in an exterior surface of a forwardmost portion of the lower guard, and the means for attaching the base end of the tongue attachment to the lower guard are rivets inserted through said apertures.

3. The tongue attachment of claim 1 wherein a first pair of apertures are drilled in the base end of the attachment and a corresponding second pair of apertures are drilled in an exterior surface of a forwardmost portion of the lower guard, and the means for attaching the base end of the tongue attachment to the lower guard are threaded bolts inserted through said apertures.

4. In a portable electric circular saw equipped with a stationary upper guard fixed to the housing thereof, a lower guard pivotally supported on the housing and positionable to encompass the cutting edge of a circular saw blade along substantially the lower half of said blade, comprising:

a substantially flat, semicircular disk-shaped interior wall having an apertured hub portion for pivotal mounting on a collar disposed about a motor shaft of the saw and having an arcuate leading edge;

a substantially flat, annular-shaped exterior wall parallel to the interior wall and having an arcuate leading edge; and a peripheral wall in the form of a semicircular band that joins the interior and exterior walls;

wherein the width of the upper guard is greater than the width of the lower guard thereby permitting the lower guard to telescope into the upper guard, and the leading edges of the interior wall and of the exterior wall each describe a quarter circle, more or less, extending from the peripheral wall radially inward and rearward, and the radius of curvature of each the leading edges of the interior and exterior walls is about half the radius of the peripheral wall thereof.

5. The Tongue attachment of claim three wherein a first pair of apertures are drilled in the base end of the attachment and a corresponding second pair of apertures are drilled in an exterior surface of the forward exterior portion of the lower guard, and the means for attaching to the lower guard are threaded bolts (Bolts not being claimed) inserted through said apertures.

* * * * *